United States Patent [19]
Chen

[11] Patent Number: 5,129,664
[45] Date of Patent: Jul. 14, 1992

[54] PEDAL-DRIVEN ROLLER-SKATE

[76] Inventor: Teng-Huang Chen, No. 159, Wu Miao Rd., Kaohsiung, Taiwan

[21] Appl. No.: 660,026

[22] Filed: Feb. 25, 1991

[51] Int. Cl.$^5$ .............................................. B62M 1/04
[52] U.S. Cl. ................................ 280/221; 280/11.115
[58] Field of Search ............ 280/220, 221, 206, 11.115

[56] References Cited

U.S. PATENT DOCUMENTS

| | | | |
|---|---|---|---|
| 1,533,824 | 4/1925 | Benjamin | 280/221 |
| 3,107,926 | 10/1963 | Verge | 280/221 |
| 3,318,614 | 5/1967 | Lee | 280/221 |

Primary Examiner—Mitchell J. Hill
Attorney, Agent, or Firm—Bacon & Thomas

[57] ABSTRACT

A pedal-driven roller-skate comprising two pedals alternatively rotated to drive three parallel sets of rollers to rotate forwards or backwards. The rollers have each two pivot holes symmetrically disposed at two eccentric locations. The first pedal is mounted on a first pair of wheel axles which are respectively fastened in the first pivot holes of the first and second parallel sets of rollers while the second pedal is mounted on a second pair of wheel axles which are respectively fastened in the second pivot holes of the second and third parallel sets of rollers. When the first pedal is rotated to a forward or upper position the second pedal is alternatively rotated to a backward or downward position.

1 Claim, 3 Drawing Sheets

PEDAL-DRIVEN ROLLER-SKATE

BACKGROUND OF THE INVENTION

The present invention relates to roller-skates and relates more particularly to a pedal-drive roller-skate.

According to conventional structure, a skateboard is generally consisting of a short, oblong board with a pair of small wheels at each end, ridden, as down and incline, usually in a standing position. This structure is designed for use as a toy rather than an exercising device.

SUMMARY OF THE INVENTION

The present invention is to make an improvement on the conventional skateboard so that it can be used as a device for exercises or physical therapy as well as for playing games.

According to the present invention, a pedal-driven roller-skate is generally comprised of three parallel sets of rollers and two pedals. The rollers which have each two pivot holes symmetrically disposed at two eccentric locations for alternatively mounting a wheel axle include a first set longitudinally disposed at one side, a second set longitudinally disposed at an opposite side and a third set longitudinally disposed at the middle. One of the pedals is longitudinally mounted on the wheel axles which are respectively fastened in the first pivot holes of the first and third sets of rollers. The other pedal is longitudinally mounted on the wheel axles which are respectively fastened in the second pivot holes of the second and third sets of rollers. Therefore, when the first pedal is rotated to a forward or upper position the second pedal is alternatively rotated to a backward or downward position.

DETAILED DESCRIPTION OF THE PREFERRED EMBODIMENT

Figure 1:
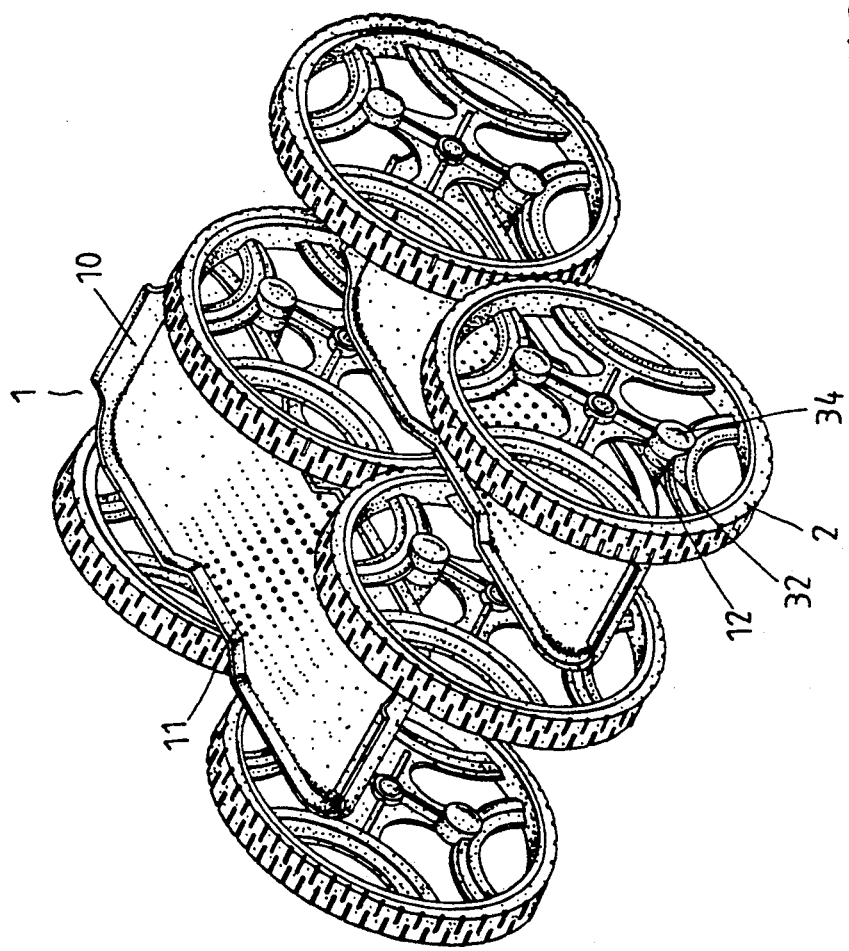
FIG. 1 illustrates the preferred embodiment of the pedal-drive roller-skate of the present invention.
Figure 2:
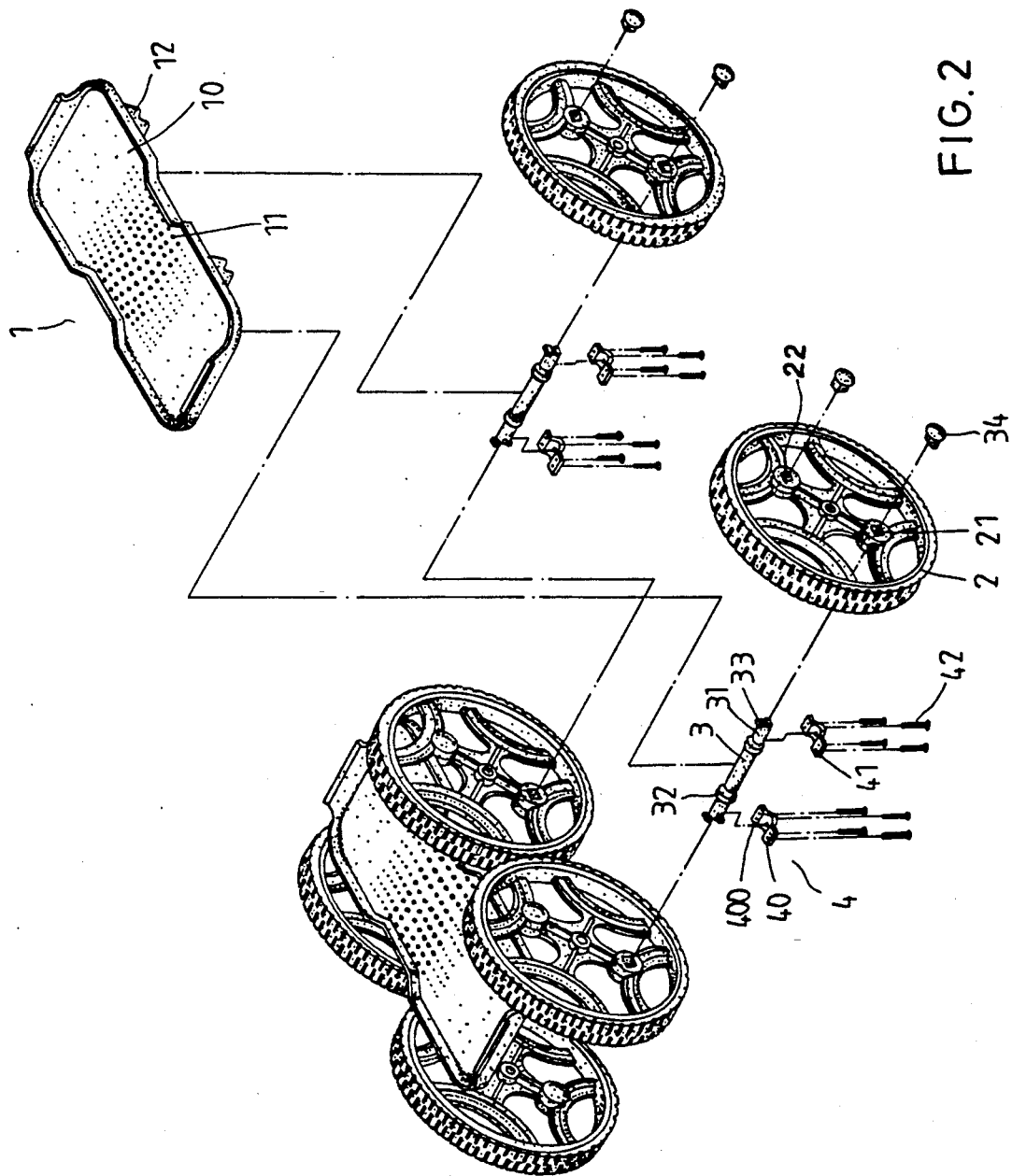
FIG. 2 is a partially dismantled view of the preferred embodiment of the pedal-drive roller-skate of the present invention.

Referring to FIGS. 1 and 2, therein illustrated is the preferred embodiment of the pedal-drive roller-skate of the present invention which is generally comprised of two pedals 1, six driven rollers 2 and two pairs of pivot bolts 3. The driven rollers 2 are arranged in three sets, and the two pedals 1 are respectively connected to the driven rollers 2 by the pivot bolts between each two of the three sets of the driven rollers 2.

The pedals 1 are each comprised of a rectangular board 10 having a plurality of raised portions 11 on the top surface thereof for skid-protection, and two axle holders 12 transversely disposed on the bottom thereof at two opposite ends for mounting the pivot bolts 3. The driven rollers 2 have each two pivot holes 21 and 22 symmetrically disposed at two eccentric locations. The pivot bolts 3 have each two retaining notches 33 at two opposite ends 31, and two opposite collars 32. During assembly, each pivot bolt 3 is transversely fastened in each axle holder 12 of each pedal 1 by clamps 4, which have each two side strips 40 and 400 at two opposite sides with a bolt hole 41 respectively made thereon for fastening a screw bolt 42 to secure said pivot bolt 3 to said pedal 1, with the two opposite ends 31 thereof respectively fastened in either one of the two pivot holes 21 and 22 of either two of the driven rollers 2. After either end 31 of each pivot bolt 3 is inserted in the pivot hole 21 or 22 of either driven roller 2, a lock member 34 is fastened from the outside of the driven roller 2 into the retaining notch 33, which is made on the end surface of each end 31 of the pivot bolt 3, to secure the pivot bolt 3 to the driven roller 2.

Figure 3B:
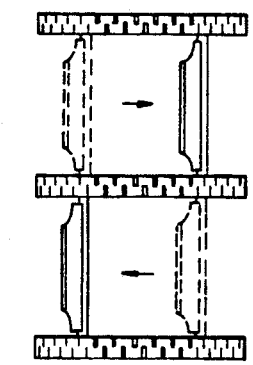
FIG. 3 is a schematic front view showing the alternative motion of the pedals.
Figure 4B:
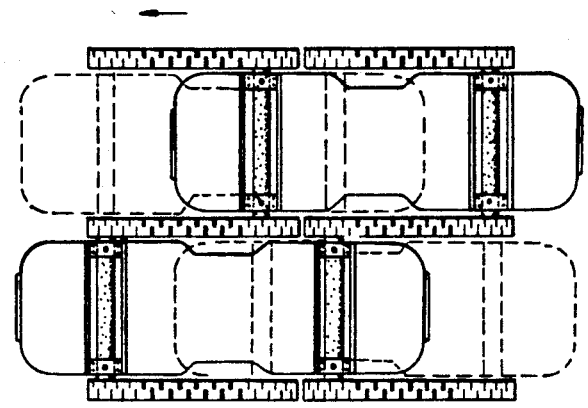
FIG. 4 is a schematic bottom view showing the alternative motion of the pedals.
Figure 3A:
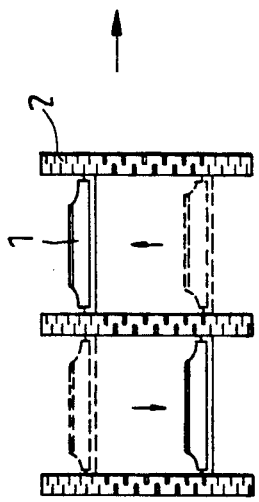
Figure 4A:
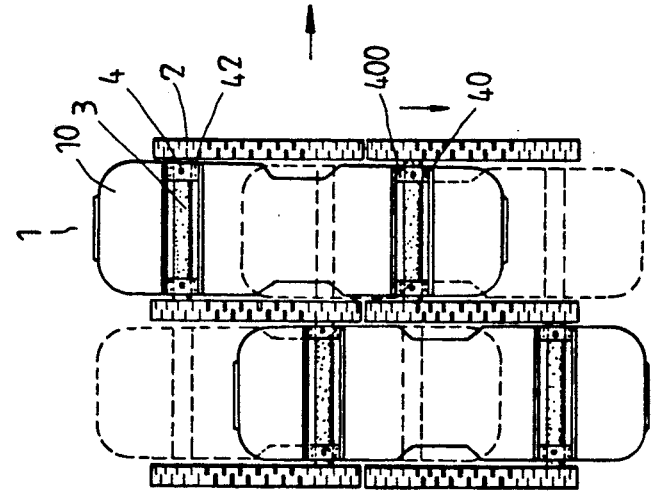

Referring to FIGS. 3 and 4, the two pedals 1 have each an adjacent side respectively connected to the two opposite sides of the two driven rollers 2 which are disposed at the middle, wherein the two pivot bolts on the pedal at the left side are respectively fastened in the first pivot hole 21 of each of the two driven rollers at the middle, the two pivot bolts on the pedal at the right side are respectively fastened in the second pivot hole 22 of each of the two driven rollers at the middle. Therefore, the pedal at the left side is rotated forwards when the pedal at the right side is alternatively rotated backwards or, the pedal at the left side is rotated upwards when the pedal at the right side is alternatively rotated downwards.

I claim:

1. A pedal-driven roller-skate, comprising:

driven rollers including at least a first pair longitudinally disposed at one side, a second pair longitudinally disposed at an opposite side and and a third pair longitudinally disposed between said first and second pairs, said driven rollers having each two pivot holes symmetrically disposed at two eccentric locations;

a first pair of wheel axles connected between said first and third pairs of driven rollers, having each two opposite ends respectively fastened in one of said two pivot holes;

a second pair of wheel axles connected between said second and third pairs of driven rollers, having each two opposite ends respectively fastened in the other of said two pivot holes;

a first pedal mounted on said first pair of wheel axles between said first and third pairs of driven rollers;

a second pedal mounted on said second pair of wheel axles between said second and third pairs of driven rollers; and wherein said first and second pedals are alternatively rotated to drive said driven rollers to run forwards or backwards.

* * * * *